(12) United States Patent
Sapek (10) Patent No.: US 8,149,694 B2
(45) Date of Patent: Apr. 3, 2012

(54) ENFORCING FAIRNESS IN AD HOC MESH NETWORKS

(75) Inventor: Adam Sapek, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1398 days.

(21) Appl. No.: 11/292,156

(22) Filed: Dec. 1, 2005

(65) Prior Publication Data

US 2007/0127419 A1    Jun. 7, 2007

(51) Int. Cl.
*G01R 31/08* (2006.01)
(52) U.S. Cl. ...................................................... 370/230
(58) Field of Classification Search .......................... None
See application file for complete search history.

(56) References Cited

U.S. PATENT DOCUMENTS

| | | | |
|---|---|---|---|
| 5,673,132 A * | 9/1997 | Carbone et al. | 398/37 |
| 6,917,985 B2 * | 7/2005 | Madruga et al. | 709/238 |
| 7,016,969 B1 * | 3/2006 | Uzun et al. | 709/233 |
| 7,046,678 B2 * | 5/2006 | Jiang et al. | 370/395.41 |
| 7,075,890 B2 * | 7/2006 | Ozer et al. | 370/230 |
| 7,146,174 B2 * | 12/2006 | Gardner et al. | 455/453 |
| 2002/0131455 A1 * | 9/2002 | Cioffi et al. | 370/503 |
| 2002/0142789 A1 * | 10/2002 | Kuhl et al. | 455/512 |
| 2005/0033859 A1 * | 2/2005 | Karsten | 709/233 |
| 2005/0052992 A1 * | 3/2005 | Cloonan et al. | 370/229 |
| 2005/0130664 A1 * | 6/2005 | Sang et al. | 455/450 |
| 2005/0152289 A1 * | 7/2005 | Nagata et al. | 370/256 |
| 2005/0163048 A1 * | 7/2005 | Arora et al. | 370/230 |
| 2005/0226153 A1 * | 10/2005 | Scifres et al. | 370/232 |
| 2005/0259644 A1 * | 11/2005 | Huitema et al. | 370/389 |
| 2006/0039281 A1 * | 2/2006 | Benveniste | 370/230 |
| 2006/0146867 A1 * | 7/2006 | Lee et al. | 370/465 |
| 2006/0221820 A1 * | 10/2006 | Zeitak | 370/229 |
| 2007/0008884 A1 * | 1/2007 | Tang | 370/230 |

* cited by examiner

*Primary Examiner* — Chi Pham
*Assistant Examiner* — Fan Ng
(74) *Attorney, Agent, or Firm* — Merchant & Gould (57) ABSTRACT

A self-adaptive algorithm to enforce fairness executes on nodes in an ad hoc wireless network. Each node is configured to measure or estimate the utilization of the RF channel in its neighborhood and then share this information with its neighboring nodes. In this way, the nodes learn about the traffic flows within their neighborhood and may determine the competing flows. Based on the information about the competing flows, each node then determines the fair share of RF channel usage. The fair share may be computed by dividing the total time that all competing flows use the RF channel by the number of competing flows. Traffic flows using more than the computed fair share of channel access are slowed down to allow more access to the RF channel for flows that are not getting their fair share.

19 Claims, 6 Drawing Sheets

*Figure 4 – the TCP flows with fairness enabled. Average throughput 1023 Kbps.*

*Fig. 6*

ENFORCING FAIRNESS IN AD HOC MESH NETWORKS

BACKGROUND

The fairness of Transmission Control Protocol (TCP) congestion control typically depends on cooperation of the endpoints of a packet flow and the congestion points within the flow. The endpoints may adjust their send rate based on perceived network conditions (delay and packet loss) and routers near the congestion points within the flow can drop packets fairly for the competing flows in case of congestion. The congestion controls that work for TCP, however, do not work properly in wireless and ad hoc networks and, in particular, in multi hop wireless mesh networks. The congestion point in wireless networks is typically the RF channel. Competing flows in ad hoc wireless networks may not share any single node that could play the role of a router in the TCP congestion control scheme. Additionally, there is no shared queue and no central point to schedule and drop packets fairly. In the absence of this mechanism, the nodes compete for the RF channel at the 802.11 Media Access Control (MAC) level. Furthermore, while MAC provides access control for the individual nodes, in multi hop wireless mesh networks some flows can be routed through several nodes, leading to additional unfairness at the flow level. This results in some flows getting unfair proportion of the RF channel.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A self-adaptive algorithm that is configured to enforce fairness executes on each of the nodes in an ad hoc wireless network. Each node within the network may be configured to measure or estimate the utilization of the RF channel in its neighborhood and then share this information with its neighboring nodes. In this way, the nodes within the network learn about the traffic flows within their space and may determine the competing flows. Based on the information about the competing flows, each node then determines the fair share of RF channel usage for a flow. The fair share may be computed by dividing the total time that all competing flows use the RF channel by the number of competing flows. Traffic flows using more than the computed fair share of channel access are slowed down to allow more access to the RF channel for flows that are not getting their fair share.

DETAILED DESCRIPTION

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
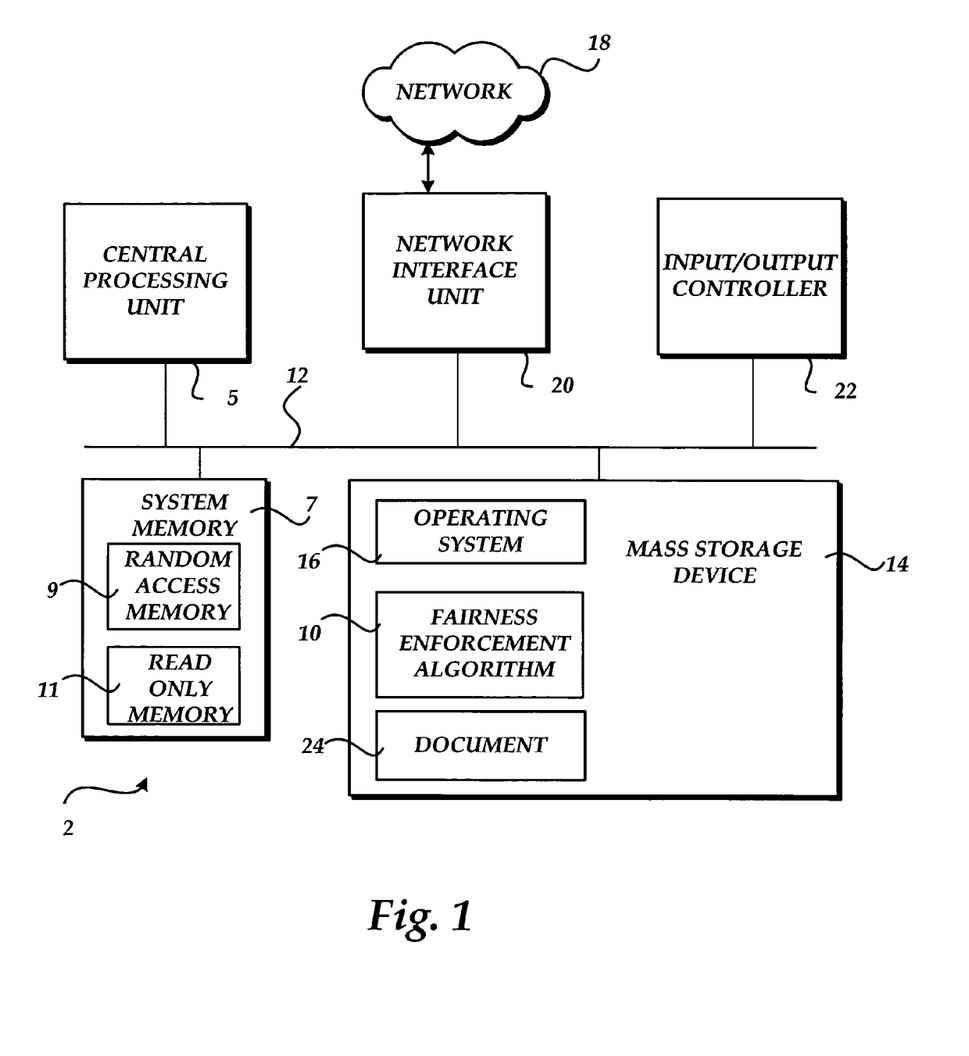
FIG. 1 illustrates an exemplary computing architecture for a computer.

Referring now to FIG. 1, an exemplary computer architecture for a computer 2 utilized in various embodiments will be described. The computer architecture shown in FIG. 1 may be configured in many different ways. For example, the computer may be configured as a node within an ad hoc mesh network, a personal computer, a mobile computer, a mesh box, and the like. As shown, computer 2 includes a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, the computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

The computer 2 operates in a networked environment using logical connections to remote computers through a network 18, such as an ad hoc wireless mesh network. The computer 2 may connect to the network 18 through a network interface unit 20 connected to the bus 12. The network interface unit 20 may be configured to connect wirelessly and/or wired to a network. The network interface unit 20 may also be utilized to connect to other types of networks and remote computer systems.

The computer 2 may also include an input/output controller 22 for receiving and processing input from a number of devices, such as: a keyboard, mouse, electronic stylus and the like. Similarly, the input/output controller 22 may provide output to a display screen, a printer, or some other type of device (not shown).

As mentioned briefly above, a number of program modules and data files may be stored in the mass storage device 14 and RAM 9 of the computer 2, including an operating system 16 suitable for controlling the operation of a networked computer, such as: the WINDOWS XP operating system from MICROSOFT CORPORATION; UNIX; LINUX and the like. The mass storage device 14 and RAM 9 may also store one or more program modules. In particular, the mass storage device 14 and the RAM 9 may store a fairness enforcement application 10. The fairness enforcement application 10 is operative to enforce fairness of network flows throughout an ad hoc wireless network. Generally, fairness enforcement application 10 is a self-adaptive algorithm that executes on each of the nodes in an ad hoc wireless network. The algorithm is configured to measure or estimate the utilization of the RF channel in its neighborhood and then share this information with its neighboring nodes. A fair share of RF channel usage is determined and the traffic flows using more than the computed fair share are slowed down to allow more access to the RF channel for flows that are not getting their fair share.

Figure 2:
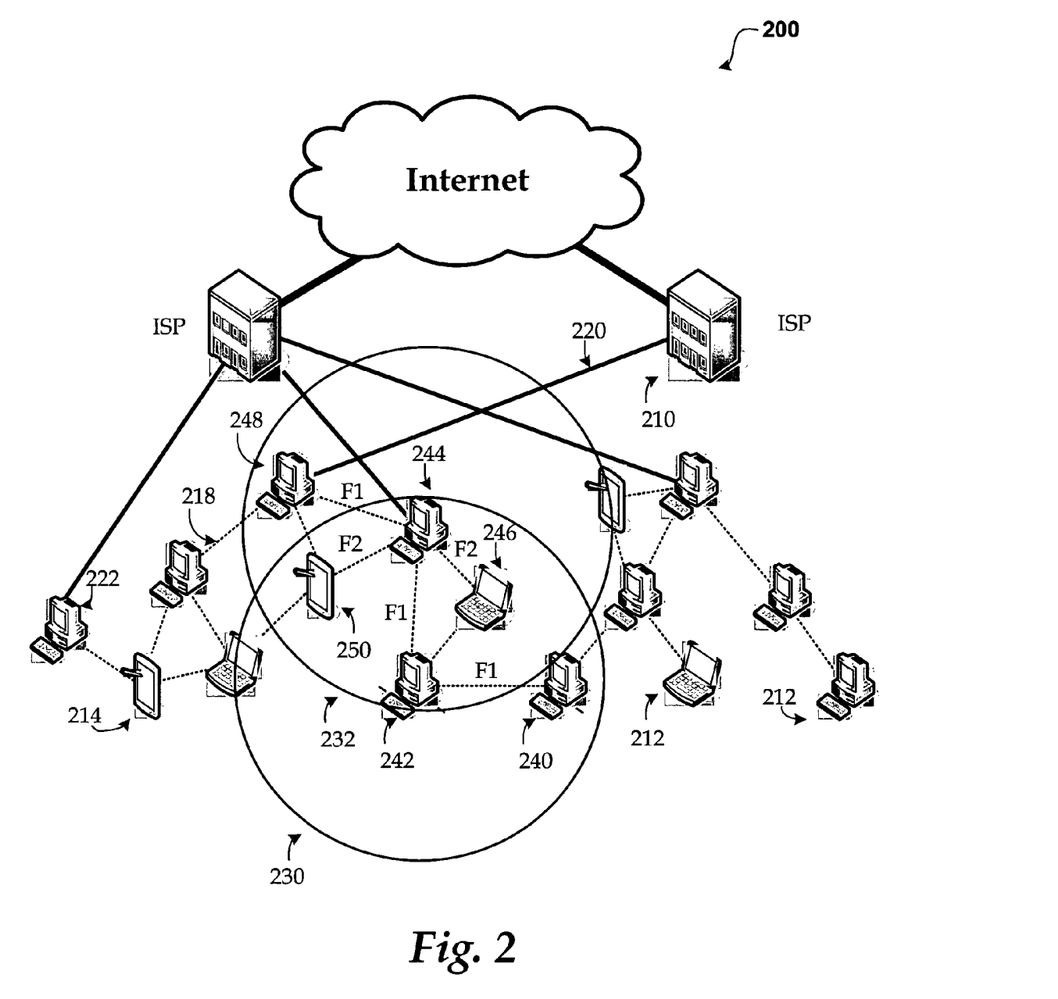
FIG. 2 illustrates a mesh network.

FIG. 2 illustrates a mesh network 200 that may be used in an exemplary embodiment of the present invention. Mesh network 200 may comprise any topology of mesh nodes, Internet service providers, and communication media. Also, the mesh network 200 may have a static or dynamic topology.

The mesh network 200 may include zero or more Internet service providers 210, which provide Internet access points for one or more mesh nodes. Each mesh node may comprise any device that is connected to the mesh network 200. The mesh node may transmit and receive data packets and also may pass data packets to other mesh nodes in accordance with the routing protocol of the mesh network 200. The mesh node may be a fixed device or a mobile device. For example, the mesh node may include a computing device 212 that is similar to computing device 2 described above in conjunction with FIG. 1. The mesh node may also include a mobile computing device 214. Other embodiments may include other configurations of mesh nodes.

According to one embodiment, the mesh network 200 has a network topology in which mesh nodes are connected with several redundant connections between the mesh nodes. The mesh network 200 may include a full mesh where every mesh node is connected to every other mesh node in the mesh network. Mesh network 200 may also include a partial mesh topology where some mesh nodes are organized in a full mesh and other mesh nodes are only connected to one or two other mesh nodes. Other mesh topologies may include one or more client subnets connected to the mesh network. These client subnets may have a plurality of clients connected thereto. The various topologies for the mesh network 200 are endless and will not be further set forth herein.

Reference number 218 indicates communication media between the mesh nodes. By way of example, and not limitation, communication media 218 may include wired media such as a wired network or direct-wired connection, and wireless media such as acoustic, RF, infrared and other wireless media. Reference number 220 indicates communication media between Internet service provider 210 and one or more of the mesh nodes. The communication media 220 may include wired media such as a wired network or direct-wired connection, and wireless media such as acoustic, RF, infrared and other wireless media. The nodes may be configured to self-form a wireless network with other nodes within a particular range.

Network 200 includes two illustrated flows. The term "flow" refers to a stream of packets between two endpoints. According to one embodiment, the endpoints of the flow are identified by their MAC addresses regardless of the specific route in the mesh network. Under the Link Quality Source Routing (LQSR) protocol, a flow is thus defined by the first and last MAC address in the hop list in Source Route option. A flow defined this way can carry multiple TCP/Internet Protocol (IP) flows. Therefore, according to one embodiment, an assumption is made that a node internally treats fairly its different TCP/IP flows sent to the same endpoint in the mesh.

Flow F1 includes node 248 as one endpoint and node 240 as the other endpoint. Node 242 and node 244 are located in flow F1 between the endpoints. Flow F2 includes node 250 as an endpoint and node 246 as an endpoint. Node 244 is located within flow F2 between the endpoints. Circle 230 shows an exemplary transmit range for 242. Circle 232 shows an exemplary transmit range for node 244. Each node includes a similar transmit range (not shown). The transmit range may be larger or smaller depending on the transmit characteristics of the node. Any node that is located within a node's transmit range can receive messages directly from the node and is considered in the neighborhood of the node. For example, node 244 is located in transmit range 232 and also in transmit range 230.

A self-adaptive algorithm runs on each of the nodes in the ad hoc wireless network. Each node is configured to measure or estimate its utilization of the RF channel. The estimation is based on the total size of the packets sent within a given time span along with the properties of the wireless link. For example, the bandwidth and packet loss rate properties of the wireless link may be considered. Each node then broadcasts this information to neighboring nodes. In neighborhood 232 node 244 would broadcast channel information to nodes 248, 250, 242 and 246. Node 242 would broadcast channel information to nodes 240, 246, 244 and 250. In this way, the nodes learn about the traffic flows within their neighborhood based on the transmit range of the nodes. The nodes can then determine which traffic flows are competing for more access to the RF channel (competing flows). According to one embodiment, a flow is considered contending if the number of unsent packets belonging to the flow that are waiting in the send queue exceeds a predefined threshold. Based on the information about all of the competing flows each node determines the fair share of RF channel usage for a flow. According to one embodiment, the fair share is equal to the total time that all contending flows use the RF channel divided by the number of contending flows. Traffic flows using more than the fair share of channel access are slowed down to allow more access to flows that are not getting their fair share of the RF channel. When a node determines that a flow is getting more than its fair share of the RF channel it drops a determined percentage of packets belonging to the flow. When the source of the flow detects that packets are being dropped it responds by decreasing the rate at which packets are sent.

Figure 3:
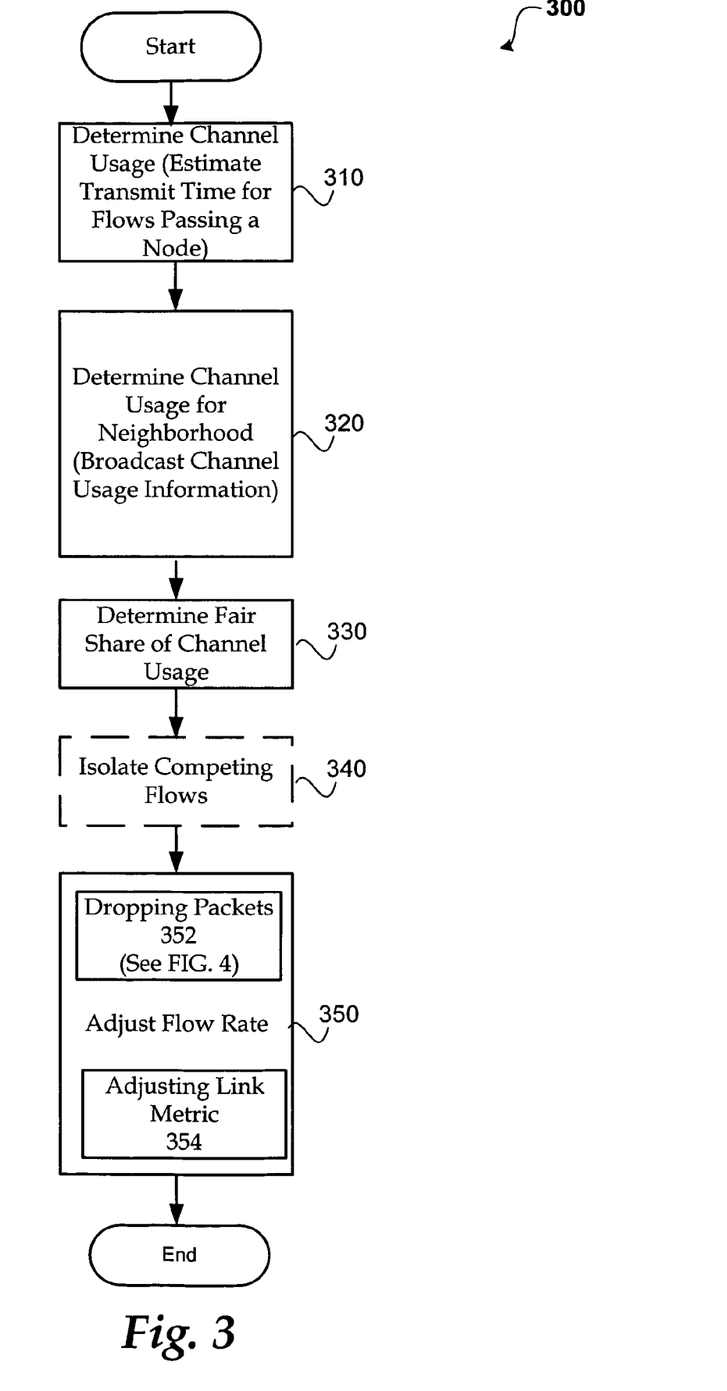
FIG. 3 shows a process for enforcing fairness in an ad hoc network.
Figure 4:
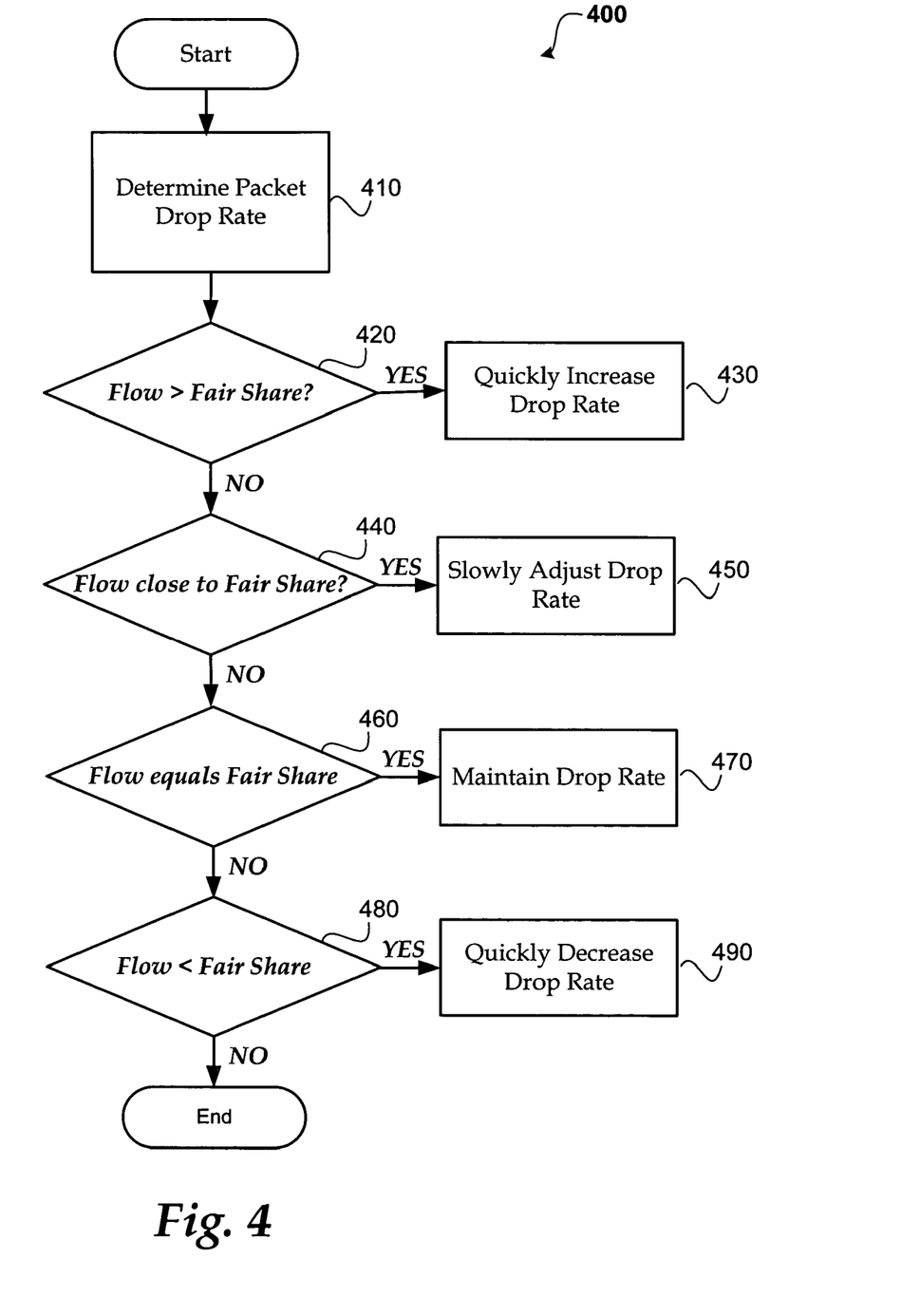
FIG. 4 illustrates a process for dropping packets.

FIGS. 3 and 4 shows a process for enforcing fairness in an ad hoc network. When reading the discussion of the routines presented herein, it should be noted that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments of the described herein are referred to variously as operations, structural devices, acts or modules. These operations, structural devices, acts and modules may be implemented in software, in firmware, in special purpose digital logic, and any combination thereof.

FIG. 3 shows a process for enforcing fairness in an ad hoc network. After a start operation, the process flows to operation 310 where each node estimates its channel usage. To determine the channel usage the node may calculate the time it takes to transmit packets for any given flow. Under the LQSR protocol, the transmit time for a packet can be estimated from the ETT metric of the link and the packet size. The metric of a link is expressed by bandwidth B and packet loss probability p. Given size of the packet S, the transmit time T can be estimated as: T=(S/B)*(1/(1−p)).

It has been found that packet loss increases disproportionately for some links during network congestion. This tends to be the links that are treated unfairly in the first place. To mitigate the effect of increasing packet loss p during network congestion a long term average of packet loss should be used in the formula. Long term packet loss will reflect property of wireless link but won't be affected by effects of network congestion.

The RF channel usage may be estimated for a flow during a given time period by dividing total transmit time of all packets sent during the time span.

Moving to operation 320, the channel usage for all flows within a neighborhood is determined. According to one embodiment, all of the competing flows within a given neighborhood are considered. If the nodes use links of different quality/speed, which is likely, each node will arrive at a different value for the same flow. Those values reflect the fact that different nodes require a different amount of time to transmit packets belonging to a given flow. According to one embodiment, the highest value reported by any node is used to represent the flow channel usage within the neighborhood. Alternatively, other calculations involving the channel usage data may be used to determine the flow channel usage. For example, an average of the data received could be used.

As there is no single node that participates in all of the flows through the mesh network, each of the nodes periodically broadcast their collected channel usage information. According to one embodiment, the channel usage information that is broadcast includes the collected information about flows the node participates in as well as the information that is received from the other nodes within their neighborhood.

Within the LQSR protocol this information can be added as a new fairness option to ETX probe which is broadcasted periodically (by default every second). According to one embodiment, even though the number of flows a node participates varies, the size of the fairness option is fixed and a space is reserved for forty (40) flows. This ensures that the Expected Transmission Count Metric ETX probe size is constant and the same for all nodes. The probe is used to estimate link packet loss rate.

According to one embodiment, when a node has multiple radios that transmit on non-interfering channel the channel usage may be collected for each different channel.

Flowing to block 330, the fair share is determined. Once every node receives usage information about all flows within their neighborhood, they can calculate the average which is an estimation of the fair channel usage level. Flows that exceed the average are slowed down thereby allowing the nodes below the average to have more access to the channel.

At optional operation 340, the competing flows may be isolated. When calculating the average usage of all the flows it may be desirable to take into account only the competing flows. Competing flows are those that could benefit from more channel access and increase their send rate. According to one embodiment, flows that are already sending at their maximum speed are excluded from the calculation to avoid artificially lowering the average. In one embodiment, the per-flow count of packets waiting in the MCL send queue is calculated. Flows which exceed a predefined threshold of queued packets are considered competing. For example, if there is more than one packet from a flow in a queue.

Flowing to operation 340, the flow rate is adjusted for the nodes that are exceeding the fair share value. Dropping packets 352 may be used to decrease send rate for flows that are getting an unfair share of channel usage.

Unfairness in ad hoc wireless mesh tends to be persistent. In other words, the ratio of channel usage for a given set of flows in a given topology is relatively constant. This implies that for any flow getting unfair share of channel access, there is a relatively constant packet drop rate that will adjust the flow to the fair level. The drop rate is not known in advance and is determined using an adaptive algorithm (See FIG. 4 and related discussion).

Dropping packets to enforce fairness is a way to artificially degrade the link quality. This degradation, however, is not detected by standard LQSR mechanisms. This may lead to LQSR using a route even when there might be a better route if fairness enforcement is taken into account. In particular, another more efficient route might be possible over a different, less congested channel. According to one embodiment, to help alleviate this effect packet drop rate may be fed back into the link metric (354).

The process then moves to an end block and returns to processing other actions.

FIG. 4 illustrates a process for dropping packets. After a start operation, the process flows to operation 410 where the packet drop rate is determined based on the fair share channel usage and the current flow usage of the channel. A node can periodically adjust its drop rate for all its flows. For example, the node may adjust its drop rate when it is about to broadcast its latest channel usage information. If a drop rate of 1/D means that 1 in every D packets is dropped, and the average channel usage for competing flows is AVG, then the packet drop rate for a flow which channel usage is F can be periodically adjusted as:

$$D=(D*AVG)/F$$

$$D=\max(D,1)$$

$$D=\min(D,D\_MAX)$$

where D_MAX is the initial value of D indicating that no packets are dropped.

Moving to decision operation 420, a determination is made as to whether the flow has a much higher usage than the fair average.

When the flow is determined to have much higher usage than is fair, the process moves to operation 430 where the drop rate is quickly increased and their send rate, and thus channel usage, decreases.

Moving to decision operation 440, a determination is made as to whether the flow is close to the fair share. When the flow is determined to be close to the fair average, the process flows to operation 450 where the drop rate will be adjusted in small increments.

Moving to decision operation 460, a determination is made as to whether the flow is equal to the fair share. When the flow is determined to be equal to the fair average, the process flows to operation 470 where the drop rate is maintained.

Moving to decision operation 480, a determination is made as to whether the flow is less than the fair share. When the flow is determined to be less than the fair share, the process flows to operation 490 where the drop rate is quickly decreased.

When the flow falls below the fair average then the packet drop rate will decrease on its own leading to increase in flow send rate. For example, when another flow disappears thereby freeing the channel. If every node within the space implements the same mechanism they can maintain all flows oscillating near fair equilibrium.

For flows that are passing through more than one node within given space there is no need for all those nodes to drop packets for the flow. Furthermore doing so could result in over-adjusting and unnecessarily jittery traffic. To avoid this, nodes can "agree" which one is responsible for regulating the flow. For example, the node can be the node reporting highest channel usage for the flow (the bottleneck node for the flow within given space). Another approach that can result in extra channel efficiency is to drop the packets on the first hop within the space (first node on the hop list that reported the flow). Whatever algorithm is used to select the node responsible for adjusting the flow it is desirable that in case of any failures (failed transitions/receives of broadcast probe) the fallback is for more than one node to drop packets rather than none.

The process then moves to an end block and returns to processing other actions.

Figure 5:
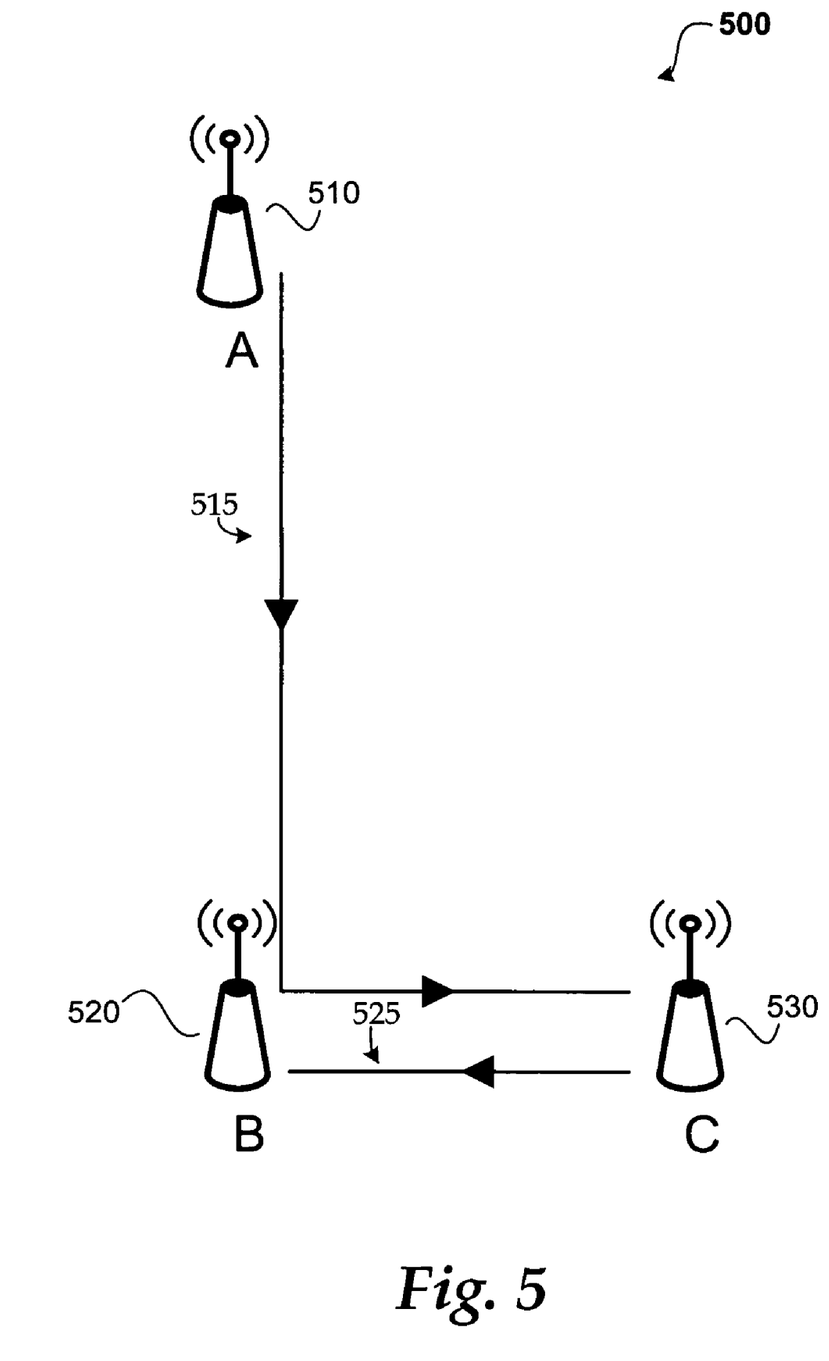
FIG. 5 shows two contending flows in a simple mesh topology.

FIG. 5 shows two contending flows in a simple mesh topology. As illustrated, there is one single hop flow and one two-hop flow.

For purposes of this example, assume that the link (525) between B (520) and C (530) is faster than the link (515) between A (510) and B (520). Two TCP connections are run in an attempt to saturate the network: A to C and C to B. The connection from A to C requires two hops.

While this experimental setup is simple, it is illustrative. Within the example network none of the three nodes is transmitting packets for both flows. Consequently, without a distributed approach neither node would have the whole picture of the network traffic and would not be able to determine and enforce fair share channel usage.

Figure 6:
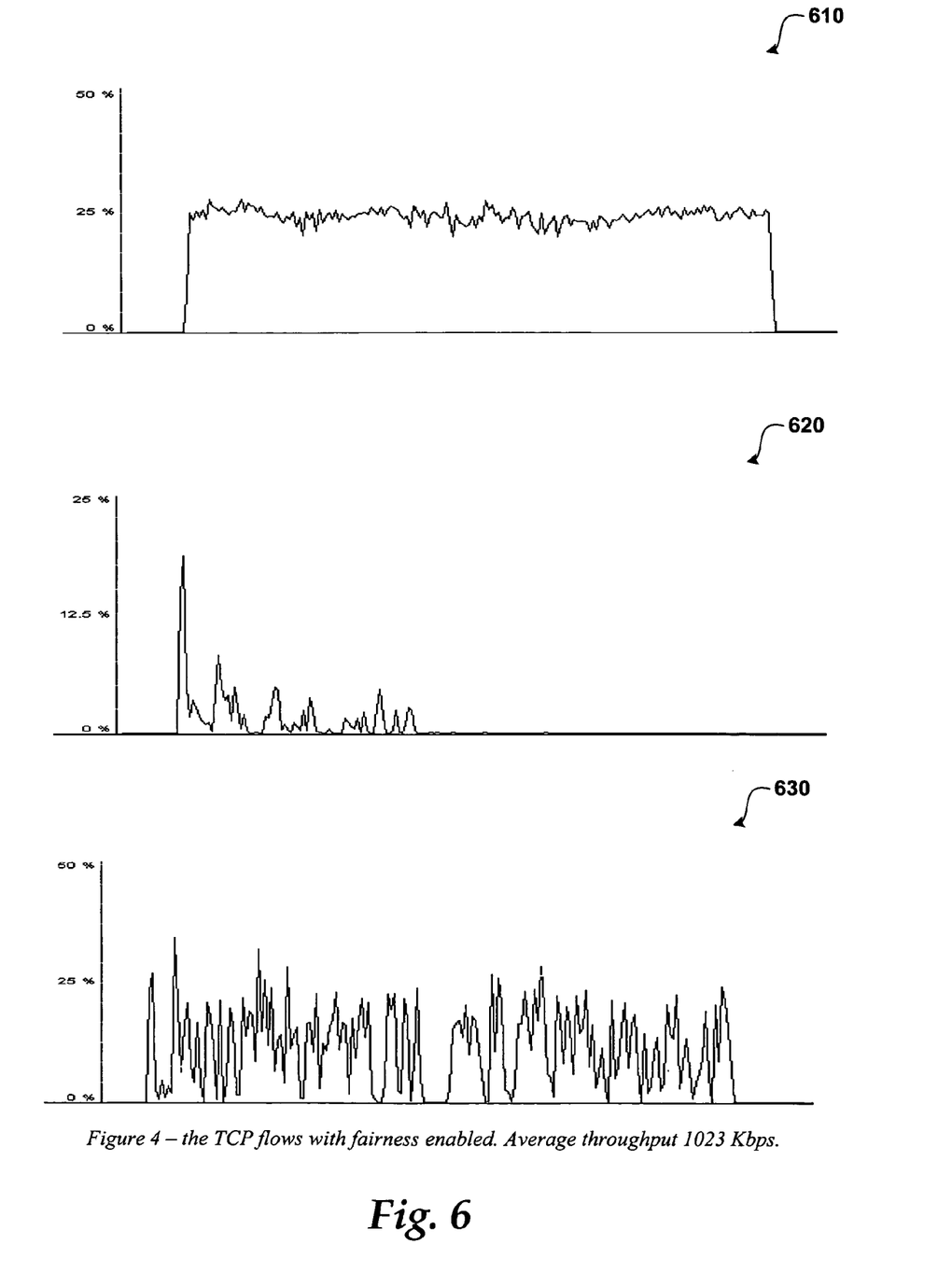
FIG. 6 illustrates flow throughput within an example network, in accordance with aspects of the present invention.

FIG. 6 illustrates flow throughput within an example network. Graph 610 illustrates a 90 second TCP connection from A to C running in isolation without any other traffic on the network. The average throughput of the network was 2197 Kbps.

Graph 620 shows the same TCP flow (A to C) contending with the one-hop flow from C to B. Graph 620 has a different scale than graph 610. Graph 620 illustrates the fairness problem. The flow from C to B overtakes the usage of the channel driving the throughput of the flow from A to C down until after about 40 seconds that flow is completely starved. The average throughput over 90 seconds for the A to C flow is 79 Kbps.

Graph 630 shows the effect of enabling the distributed fairness algorithm on the same two TCP connections (A to C) and (B to C). As shown by graph 630, the starvation of flow A to C is prevented and the average throughput over 90 seconds is 1023 Kbps. This is close to 50% of the throughput the connection registered on quiet network.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for enforcing fairness in an ad hoc wireless network, comprising:
    monitoring entire flows between mesh nodes within the ad hoc wireless network;
    on each of the mesh nodes within the ad hoc wireless network, using a processor in determining a channel usage for flows between mesh nodes within the ad hoc wireless network; wherein the mesh nodes within the ad hoc wireless network transmit and receive data packets from other mesh nodes within the network; wherein each of the flows is a stream of packets between two endpoints on the ad hoc wireless network; wherein at least one of the flows within the ad hoc wireless network includes one or more intervening mesh nodes between the two endpoints; wherein each of the mesh nodes shares the channel usage with each of its neighbors that are within a range by transmitting the channel usage; wherein the one or more intervening mesh nodes between the two endpoints and the two endpoints each determine the channel usage;
    determining an average flow for competing flows among the flows;
    determining a fair share of channel usage based on the determined channel usage for the competing flows and the average flow for the competing flows; and
    adjusting a flow rate for at least one of the nodes within the network based on the determined fair share.

2. The computer-implemented method of claim 1, wherein determining the channel usage for competing flows comprises determining the channel usage for each node within a neighborhood of the network.

3. The computer-implemented method of claim 2, further comprising broadcasting the channel usage information to other nodes within the neighborhood.

4. The computer-implemented method of claim 1, wherein determining the fair share of channel usage comprises determining a number of the competing flows and dividing a time that the competing flows utilize the channel by the number of competing flows.

5. The computer-implemented method of claim 1, wherein adjusting the flow rate for at least one of the nodes within the network based on the determined fair share comprises dropping packets.

6. The computer-implemented method of claim 1, wherein determining the channel usage for competing flows comprises determining a time it takes to transmit packets for each of the competing flows.

7. The computer-implemented method of claim 6, wherein determining the time it takes to transmit packets for the competing flows comprises performing the calculation: $(S/B)*(1/1-p)$ for each of the competing flows; where S is a size of the packet; B is a bandwidth; and p is a probability of packet loss.

8. The computer-implemented method of claim 7, wherein adjusting the flow send rate for the at least one of the nodes within the network based on the determined fair share comprises determining when a flow exceeds the fair share.

9. A tangible computer-readable storage medium having computer-executable instructions for enforcing channel usage for flows; comprising:
    monitoring entire flows between mesh nodes within the ad hoc wireless network;

at mesh nodes within an ad hoc wireless network, determining a channel usage for a channel through the mesh node and sharing the channel usage with neighbors of the mesh node;

determining a neighborhood channel usage for a neighborhood that is associated with the node;

determining a fair share channel usage based on the neighborhood channel usage and the channel usage for the channel through the node; wherein determining the fair share of channel usage comprises determining an average flow for competing flows; wherein each of the competing flows is a stream of packets between two endpoints on the ad hoc wireless network; wherein at least one of the competing flows within the ad hoc wireless network includes one or more intervening mesh nodes between the two endpoints; wherein the one or more intervening mesh nodes between the two endpoints and the two endpoints each determine the channel usage; and adjusting a flow rate for at least one of the nodes within the network based on the determined fair share channel usage.

10. The computer-readable storage medium of claim 9, further comprising broadcasting the channel usage for the channel through the node to other nodes within the neighborhood.

11. The computer-readable storage medium of claim 10, further comprising adjusting a link metric to determine a more efficient route.

12. The computer-readable storage medium of claim 11, wherein dropping packets comprises determining at least one of: when the flow of the node exceeds the fair share channel usage; when the flow of the node is close to the fair share channel usage; and when the flow equals the fair share channel usage.

13. The computer-readable storage medium of claim 12, further comprising performing at least one of: adjusting the packet drop rate quickly when the flow exceeds the fair share channel usage; adjusting the packet drop rate slowly when the flow is close to the fair share channel usage and resetting the packet drop rate when the flow equals the fair share channel usage.

14. An apparatus for enforcing fairness in an ad hoc wireless mesh network, comprising:

a processor;

a network interface unit configured to connect to the ad hoc wireless mesh network and that is configured to send and receive flows through a channel; wherein each of the flows is a stream of packets between two endpoints on the ad hoc wireless mesh network; wherein at least one of the flows within the ad hoc wireless network includes one or more intervening mesh nodes between the two endpoints; and an algorithm configured to perform steps using the processor, including:

determining a channel usage for the flows through the channel between mesh nodes within the ad hoc wireless network; wherein determining the channel usage for the flows through the channel comprises determining a number of channels used and determining the channel usage for each of the number of channels;

sharing the channel usage information with neighbors by each of the mesh nodes that determine the channel usage information transmitting the channel usage information;

processing neighborhood channel usage information;

determining a fair share channel usage; and adjusting a flow rate.

15. The apparatus of claim 14, wherein the algorithm is further configured to broadcast the channel usage for the flows through the channel.

16. The apparatus of claim 15, wherein determining the fair share channel usage comprises determining an average flow for competing flows.

17. The apparatus of claim 16, wherein adjusting the flow rate for at least one of the nodes within the network based on the determined fair share comprises performing dropping packets at a determined rate.

18. The apparatus of claim 14, wherein dropping packets comprises determining at least one of: when the flow of the node exceeds the fair share channel usage; when the flow of the node is close to the fair share channel usage; and when the flow equals the fair share channel usage and adjusting the packet drop rate quickly when the flow exceeds the fair share channel usage; adjusting the packet drop rate slowly when the flow is close to the fair share channel usage; quickly decreasing the packet drop rate when the flow is less than the fair share; and maintaining the packet drop rate when the flow equals the fair share channel usage.

19. The apparatus of claim 14, wherein determining the channel usage for the flows through the channel comprises determining a number of channels used and determining the channel usage for each of the number of channels.

* * * * *